US012422826B2

(12) United States Patent
Xu et al.

(10) Patent No.: US 12,422,826 B2
(45) Date of Patent: Sep. 23, 2025

(54) SYSTEMS AND METHODS FOR GENERATING A ZERO-WASTE DESIGN PATTERN AND REDUCTION IN MATERIAL WASTE

(71) Applicant: SXD, Inc., Chatham Township, NJ (US)

(72) Inventors: Shelly Xu, Chatham Township, NJ (US); Tuanfeng Wang, Chatham Township, NJ (US)

(73) Assignee: SXD, INC., Chatham Township (JE)

( * ) Notice: Subject to any disclaimer, the term of this patent is extended or adjusted under 35 U.S.C. 154(b) by 14 days.

(21) Appl. No.: 18/143,073

(22) Filed: May 4, 2023

(65) Prior Publication Data
US 2023/0367292 A1 Nov. 16, 2023

Related U.S. Application Data

(60) Provisional application No. 63/340,684, filed on May 11, 2022.

(51) Int. Cl.
*G05B 19/4155* (2006.01)
*A41H 3/00* (2006.01)
*G06Q 10/04* (2023.01)

(52) U.S. Cl.
CPC ......... *G05B 19/4155* (2013.01); *A41H 3/007* (2013.01); *G06Q 10/043* (2013.01); *Y02P 80/40* (2015.11)

(58) Field of Classification Search
CPC ........ G06Q 10/043; G05B 2219/45191–45196
(Continued)

(56) References Cited

U.S. PATENT DOCUMENTS 3,596,068 A * 7/1971 Doyle ................... A41H 3/007
702/158
4,874,157 A * 10/1989 Jung .................... G06Q 10/043
270/30.02
(Continued)

FOREIGN PATENT DOCUMENTS

EP 0880910 A1 * 12/1998 ............. A41H 3/007
JP 2005275682 A * 10/2005
(Continued)

*Primary Examiner* — Grace Huang
(74) *Attorney, Agent, or Firm* — SOROKER AGMON NORDMAN RIBA

(57) ABSTRACT

The present invention discloses systems and methods for generating a zero-waste design pattern and reduction in fabric/material waste including but not limited to garment (s), furniture, shoes and other accessories, wherein the method comprises the steps of: (i) accepting a target design input comprising a first plurality of cut pieces; (ii) rendering a first 3D clothing surface from the first plurality of cut pieces from the target design input; (iii) merging/splitting, optimizing and packing the first plurality of cut pieces iteratively to yield a second plurality of cut pieces; (iv) rendering a second 3D clothing surface from the second plurality of cut pieces; and (v) comparing the first 3D clothing surface and second 3D clothing surface and performing the tasks of merging/splitting, optimizing and packing iteratively when a distortion between the first 3D clothing surface and second 3D clothing surface exceeds a pre-defined threshold value.

6 Claims, 18 Drawing Sheets

(58) Field of Classification Search
USPC .................... 700/131, 134, 135, 167, 171
See application file for complete search history.

(56) References Cited

U.S. PATENT DOCUMENTS

| | | | | |
|---|---|---|---|---|
| 5,258,917 | A * | 11/1993 | Bruder | C14B 5/00 |
| | | | | 702/167 |
| 5,430,831 | A * | 7/1995 | Snellen | G06Q 10/043 |
| | | | | 700/214 |
| 5,703,781 | A * | 12/1997 | Martell | A41H 3/007 |
| | | | | 700/135 |
| 5,831,857 | A * | 11/1998 | Clarino | G06Q 10/043 |
| | | | | 700/134 |
| 6,314,334 | B1 * | 11/2001 | Berlin | G06Q 10/043 |
| | | | | 700/134 |
| 9,623,578 | B1 * | 4/2017 | Aminpour | B26D 5/007 |
| 9,681,694 | B2 * | 6/2017 | Ng | D04B 37/00 |
| 9,840,091 | B2 * | 12/2017 | Cloots | G06F 3/1208 |
| 9,852,533 | B2 * | 12/2017 | Harvill | G06T 11/001 |
| 10,229,228 | B2 * | 3/2019 | Belmans | G06F 30/23 |
| 10,376,008 | B2 * | 8/2019 | Nouais | A41H 3/007 |
| 10,588,369 | B2 * | 3/2020 | Ruppert-Stroescu | |
| | | | | A41H 42/00 |
| 10,617,165 | B2 * | 4/2020 | Ngo Ngoc | G06F 30/00 |
| 11,090,828 | B2 * | 8/2021 | Valeze | B26F 1/3806 |
| 11,107,147 | B2 * | 8/2021 | Page | G06Q 50/04 |
| 11,109,627 | B2 * | 9/2021 | Krishnan | G06Q 50/04 |
| 11,503,870 | B2 * | 11/2022 | Aggarwal | A41H 3/007 |
| 11,712,904 | B2 * | 8/2023 | Landau | B41J 11/663 |
| | | | | 700/131 |
| 2006/0235656 | A1 * | 10/2006 | Mochimaru | A41H 3/007 |
| | | | | 703/1 |
| 2016/0210088 | A1 * | 7/2016 | Van Den Branden | |
| | | | | G06F 3/1219 |
| 2021/0227912 | A1 * | 7/2021 | Ma | G06T 19/20 |
| 2023/0354941 | A1 * | 11/2023 | Yeung | G06T 7/41 |
| 2024/0365901 | A1 * | 11/2024 | Lenihan | A41H 3/007 |
| 2025/0151828 | A1 * | 5/2025 | Kawasaki | G06F 30/20 |

FOREIGN PATENT DOCUMENTS

| | | | |
|---|---|---|---|
| JP | 2021066964 A * | 4/2021 | |
| JP | 2021134429 A * | 9/2021 | |
| WO | WO-2024055136 A1 * | 3/2024 | |

* cited by examiner

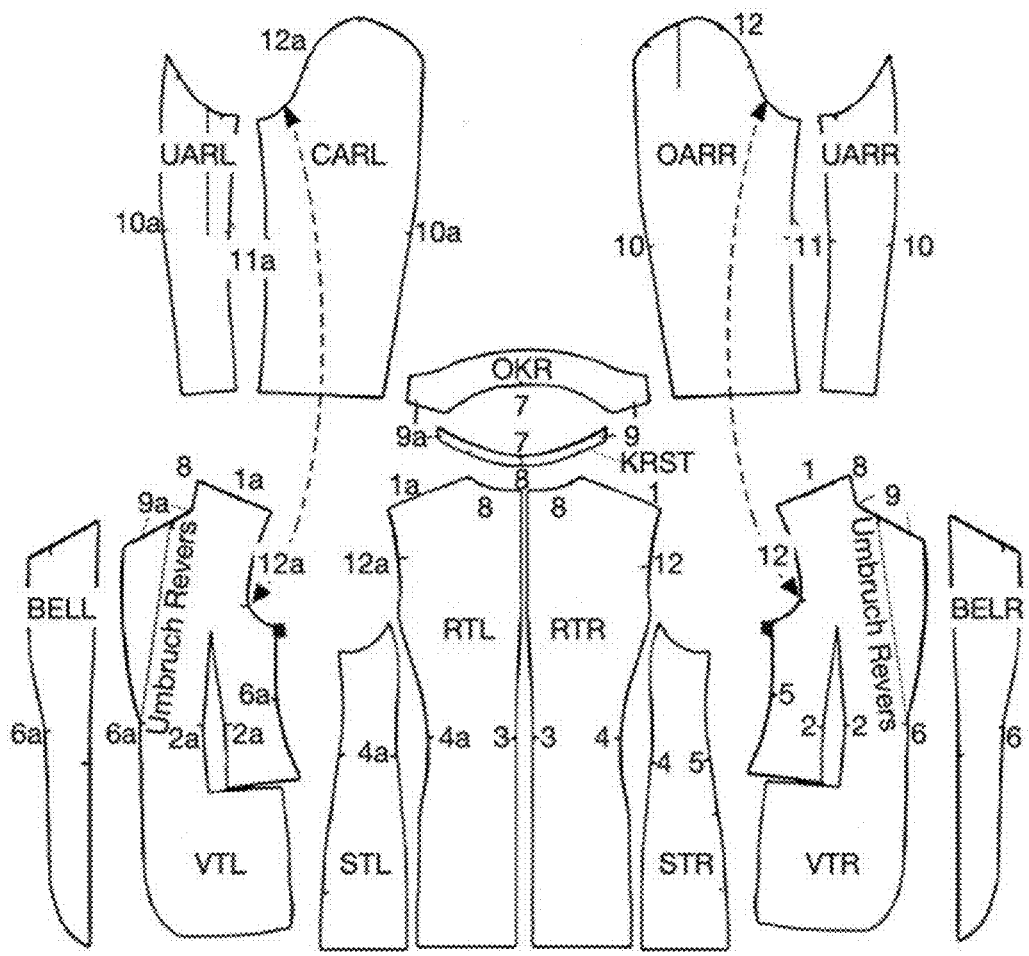
FIG 1- Prior art
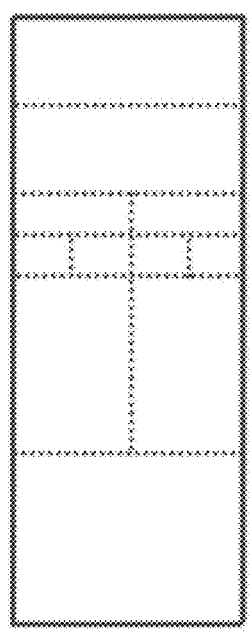
FIG 2

61 in

| Organic Cotton Fabric 61 in | | |
|---|---|---|
| BODY, FRONT<br>22.5 in<br>28 in | HOOD, INNER LEFT<br>13.25 in | 9.25 in |
| | HOOD, OUTER RIGHT<br>9.25 in<br>16 in | 13.25 in |
| BODY, BACK<br>22.5 in<br>28 in | HOOD, OUTER LEFT<br>9.25 in | 13.25 in |
| | HOOD, INNER RIGHT<br>13.25 in<br>16 in | 9.25 in |
| 10.5 in<br>SLEEVE, BACK RIGHT<br>SLEEVE, FRONT LEFT<br>5.5 in  18 in | 5.5 in<br>SLEEVE, BACK LEFT<br>10.5 in<br>SLEEVE, FRONT RIGHT<br>18 in | 10.5 in<br>POCKET<br>5.5 in<br>8 in  | 16 in |

FIG 4e

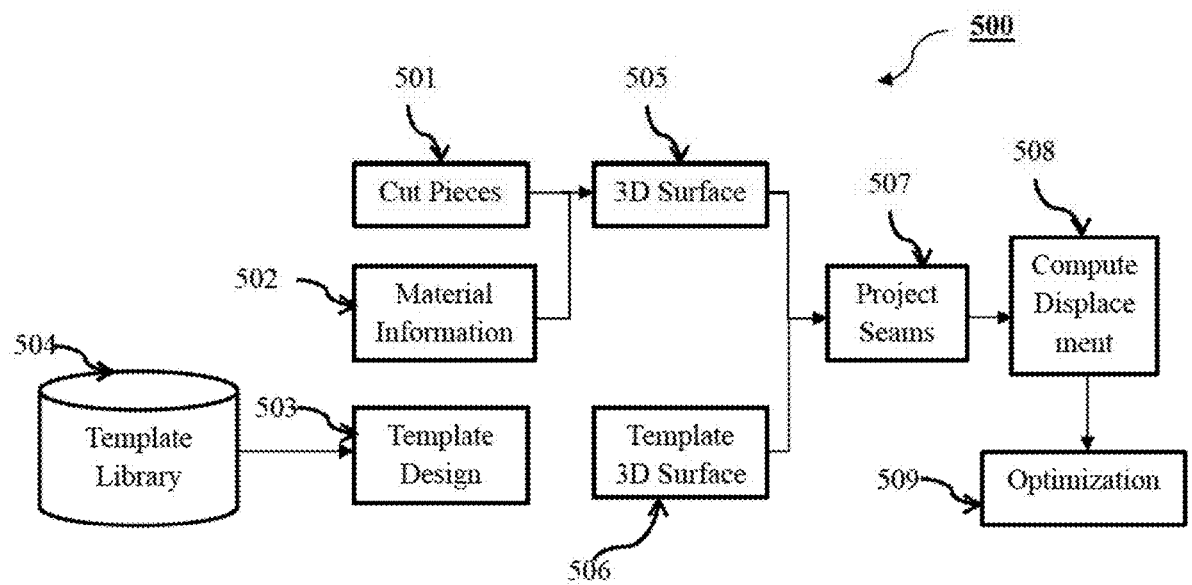
FIG 5
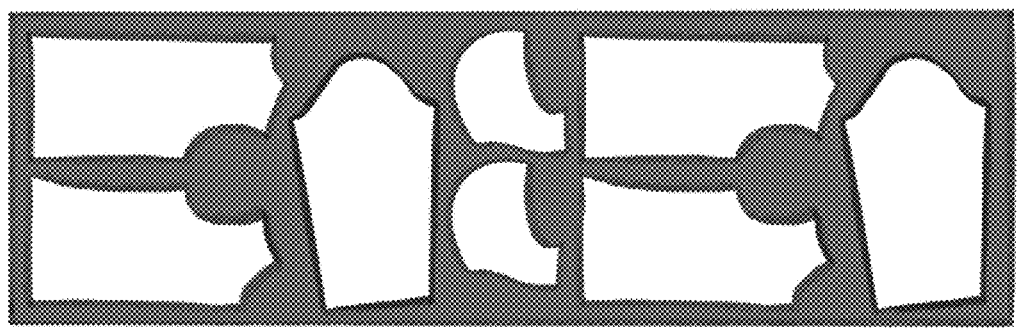
FIG 6 - Prior art

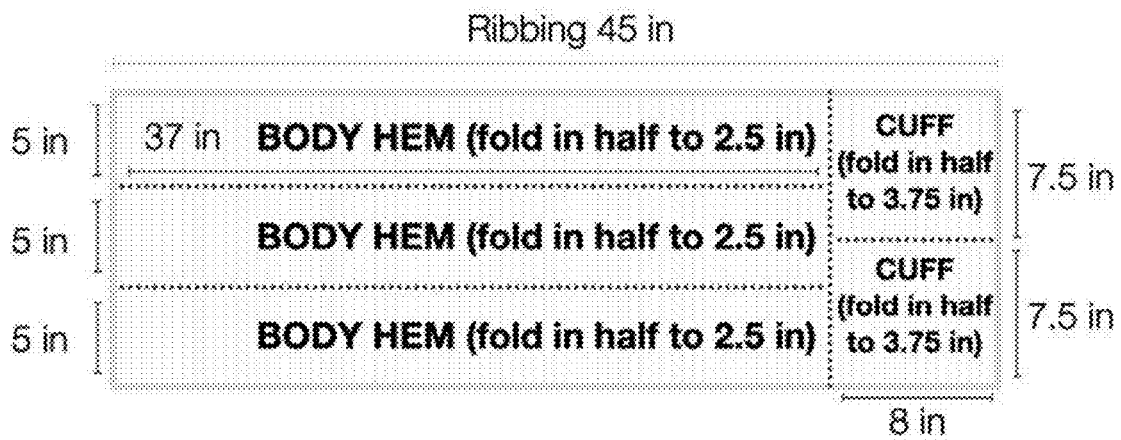
* A 45 in x 15 in piece of ribbing creates three hems for the body and one set of cuffs. (See figure above)
* For extra cuffs, align cuffs along the 45 in width, creating 5 cuffs with 4-5 in left that can be combined with another 4-5 in piece to create another cuff. (See figure below)
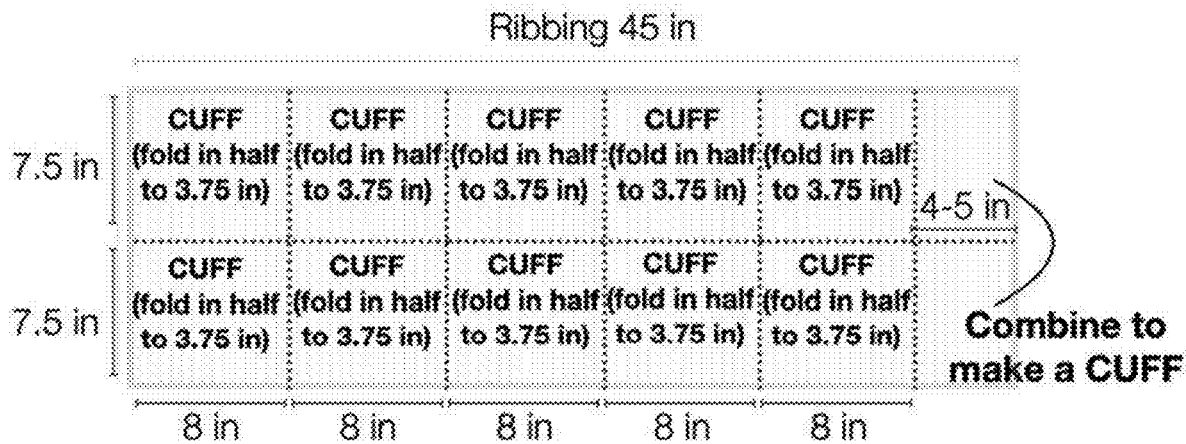
FIG 8

SYSTEMS AND METHODS FOR GENERATING A ZERO-WASTE DESIGN PATTERN AND REDUCTION IN MATERIAL WASTE

PREAMBLE TO THE DESCRIPTION

The following specification particularly describes the invention and the manner in which it is to be performed:

DESCRIPTION OF THE INVENTION

Technical Field of the Invention

The present invention relates in general to systems and methods for generating zero-waste design patterns, wherein the generated design patterns include but are not limited to garment(s), furniture, shoes and other accessories. The invention particularly relates to a multi-task optimization method for achieving zero-waste design patterns and reducing fabric or any material waste during material fabrication.

Background of the Invention

Fabric is typically the number one or number two largest contributor to the cost of apparel production. However, 92 million tons of fabric is wasted each year in the fashion industry. The problem is getting worse. By 2030, more than 134 million tons of textiles is projected to be wasted each year. Fabric or material waste begins with design. For example, today, the apparel production process starts with the creative designer's vision, usually in the form of abstract 2D illustration. Such illustrations dictate the aesthetic direction of a garment but do not account for sources of fabric or how the fabric/material would eventually be cut into the final 3D article.

The creative illustration is then translated into patterns, specifications and tech packs by technical designers, pattern makers or manufacturers, who determine how the fabric or material can be cut to achieve the original illustrated vision. The patterns, tech pack and specification sheet are comprised of detailed information regarding a garment design, including the cut pieces, dimensions, care label instructions, art-work placement, fabric/material specifications, packing instructions, and other technical information about the product necessary to quote and assemble a finished product. Because industry norms dictate that design is predominant, technical designers, pattern makers or manufacturers work to get as close as possible to the original creative illustration, resulting in irregularly shaped cuts that prioritize the set aesthetic over any material consideration, resulting in fabric or material waste.

A supplement to manual design and pattern placement is to apply an automated nesting algorithm, which lays out cut pieces in ways that reduce raw material waste. In apparel, an automated nesting algorithm can reduce fabric or material waste by providing a placement of fabric/material pieces. However, because the fabric/material pieces remain irregular shapes that cannot be changed, they do not fit together, and the fabric/material saving is limited to only a few percentage points. An exemplary automated nesting algorithm realizes only a 4% fabric saving. Since most apparel and fabric-based furniture designs have 10-30% fabric and/or material waste, 4% savings is far from zero-waste.

Zero-waste or zero fabric/material waste designs are garment designs that do not leave any scrap fabric or materials behind as waste. Zero-waste can be achieved through strategic cutting, folding, or hanging of the fabric/material. In the apparel space, while various forms of zero-waste clothing designs do exist today, they have major drawbacks, including: (i) They end up consuming more fabric/material through unnecessary folds, darts or drapes, removing the material saving that should be associated with zero-waste designs; (ii) They rely on complex/more cuts or patch works. This increases the cutting time and/or sewing time, making the garment more labour intensive (e.g., by increasing cutting time) during the production process and therefore more costly; and (iii) They are limited to simple or "boxy" designs like the sari or kimono.

For instance, the U.S. Pat. No. 10,588,369B2 titled "Textile repurposing and sustainable garment design" discloses a method of upcycling a plurality of cloth articles to form a garment. In some embodiments, the fabric/material pieces will be positioned inside of one or more pattern pieces so as to completely cover each one without overlapping its border. The positioned pieces will be treated with an adhesive and then have a paper layer adhered to it to hold the positioned fabric/material pieces in place while they are stitched together. Then, the resulting sandwich will be soaked to remove the paper and dissolve the adhesive. The resulting unified fabric/material component will then be available to be stitched together with other similarly formed fabric components to form a garment. However, the prior art does not discuss (i) minimizing fabric/material consumption to enable total material savings; and (ii) minimizing garment complexity to reduce cutting time and sewing time during production thereby leading to more efficient designs.

Hence, there exists a need for an interactive workflow that generates designs for clothing, shoes, accessories, and other articles that achieves zero-waste.

SUMMARY OF THE INVENTION

The present invention overcomes the drawbacks of the prior art by providing an interactive workflow that generates designs for clothing, shoes, accessories, furniture, and other articles to achieve zero-waste. The proposed method achieves zero-waste while finding an optimized balance among: (i) minimizing fabric or material consumption to enable total material savings (calculated as the difference in length of fabric or area of material needed compared to the previous version of the same or similar style); (ii) minimizing garment complexity to reduce cutting time and sewing time during production, which leads to more efficient designs; and (iii) closely approximating the look of the original desired design.

According to embodiments of the present disclosure, methods of and computer program products for reduction in fabric/material waste in material and accessory fabrication are provided. A target design comprising a first plurality of cut pieces is considered. The first plurality of cut pieces is rendered as a first 3D surface. The first plurality of cut pieces is iteratively merged/split, optimized, and packed to yield a second plurality of cut pieces. The second plurality of cut pieces is rendered as a second 3D surface. The first and second 3D surfaces are compared and the said merging/splitting, optimizing, and packing are repeated when a distortion between the first and second 3D surfaces exceeds a predetermined level.

In various embodiments, the present disclosure takes a fabric first approach with two inputs: (i) the fabric/material dimensions; and (ii) the desired design style. This method then deconstructs and fits the desired design within the creative constraints of the fabric/material dimension. This forces any creative design to take into account fabric/material use, shapes, cuts, and layout so that the fabric/material pieces fit together without wastage in between. The results are puzzle-like fabric/material pieces that fit together rather than the traditional asymmetrical/amorphous ones. Although some of the output zero-waste cuts may be straighter, the output avoids boxy/constrained designs by taking advantage of the flow of the soft fabric, as well as utilizing both sides of any curved cuts for garment design thereby allowing for familiar apparel silhouettes that look fitting to the body.

Embodiments of the present disclosure optimize shapes, efficiency, and design while enabling zero-waste. This leads to a significant improvement over alternative methods that traditionally result in 10-30% of fabric/material waste for many garments and upholstery. Garments that require additional fabric orientation or fabric print alignments (e.g., a cartoon print on the front-center of a dress) can translate to 40%+ fabric/material waste. A skilled technical designer or pattern maker making a pattern that must adhere strictly to an initial design illustration still leaves about 15-20% of the fabric/material as waste on the cutting room floor. The proposed process in the present invention is not only limited to obtaining zero-waste design pattern output but also extends to a significant reduction in fabric/material consumption by often 25% to 30% or more due to improved design efficiency.

The present invention provides a system for generating a zero-waste design pattern and reduction in material waste. The system comprises a computing node, which further comprises a computer server that is capable of executing a process for reduction in the fabric/material waste in the material fabrication, wherein the computer server comprises: (i) a system memory which is a computer readable storage medium configured with multiple program modules for performing a multi-task optimization method for reduction in the fabric/material waste in the material fabrication; (ii) multiple processing units, which are capable of executing the program modules stored in the system memory, wherein the processing units sequentially execute the multi-task optimization method comprising the steps of a patch merge, a patch shape optimization, a strip packing, and a patch split which are performed iteratively to improve the packing efficiency of garments; and (iii) a network adapter for enabling wired or wireless communication between the components of computer server through a bus.

Further, the present invention provides a method for reduction in fabric/material waste in garment, accessory and furniture fabrication, wherein the method comprises the following steps: (i) accepting a target design input comprising a first plurality of cut pieces including but are not limited to pattern, wherein in accordance to an embodiment of the invention, the target design input is not limited to cut pieces but also extends to input from a template library or a two-dimensional (2D) or three-dimensional (3D) design; (ii) rendering a first 3D clothing surface from the first plurality of cut pieces from the target design input; (iii) merging/splitting, optimizing and packing the first plurality of cut pieces including but not limited to pattern, iteratively to yield a second plurality of cut pieces; (iv) rendering a second 3D clothing surface from the second plurality of cut pieces including but are not limited to pattern; and (v) comparing the first 3D clothing surface and second 3D clothing surface and performing the tasks of merging, optimizing and packing iteratively when a distortion between the first 3D clothing surface and second 3D clothing surface exceeds a pre-defined threshold value.

In various embodiments, a traditional design tech pack, pattern or a design illustration in 2D or 3D is provided as input. A multi-objective optimization on the tech pack, pattern or illustration is performed to find a local optimal solution that: (i) minimizes material waste and total fabric/material consumption based on the fabric/material dimensions; (ii) minimizes cutting/sewing time; and (iii) maximizes the similarity to the original design in 3D. In addition to the optimization, a user may interact with the resulting output 2D pattern or the illustration, applying further aesthetic adjustments. The user interaction and optimization may continue iteratively until a final pattern or tech pack is generated.

Embodiments of the present disclosure use an interactive, iterative process that uses the chosen fabric or material as the creative constraint, then optimizes the fabric/material piece shapes (through patch shape optimization), placements (through packing algorithm) and cuts (through a combination of patch split/merge and shape optimization) for the desired apparel design in order to: (i) eliminate waste; (ii) simplify garment construction; and (iii) preserve desired design.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

FIG. 1 illustrates exemplary jacket fabric cuts from a traditional jacket design.

FIG. 2 illustrates exemplary jacket cuts generated according to an embodiment of the present disclosure.

FIGS. 4e, 4f and 4g illustrate zero-waste designs across different fabric widths for the same style.

FIG. 6 illustrates exemplary hoodie fabric cuts from a traditional hoodie design.

FIGS. 7 & 8 illustrate exemplary hoodie cuts generated according to an embodiment of the present disclosure.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

FIG. 1 illustrates exemplary jacket fabric cuts. An example is provided of traditional jacket cuts (such as would be included in a pattern). The cuts include various irregular shapes, which contribute to significant cut time and preclude efficient layout on fabric, contributing to waste.

FIG. 2 illustrates exemplary jacket cuts generated according to an embodiment of the present disclosure. The cuts fit into a rectangular piece of fabric without any gaps, thereby minimizing both cut time and waste. Additionally, fitting all pattern pieces into a rectangular piece of fabric allows for scaled production with zero fabric waste, as each additional unit produced can be placed precisely along the edge of the previous unit.

Figure 3:
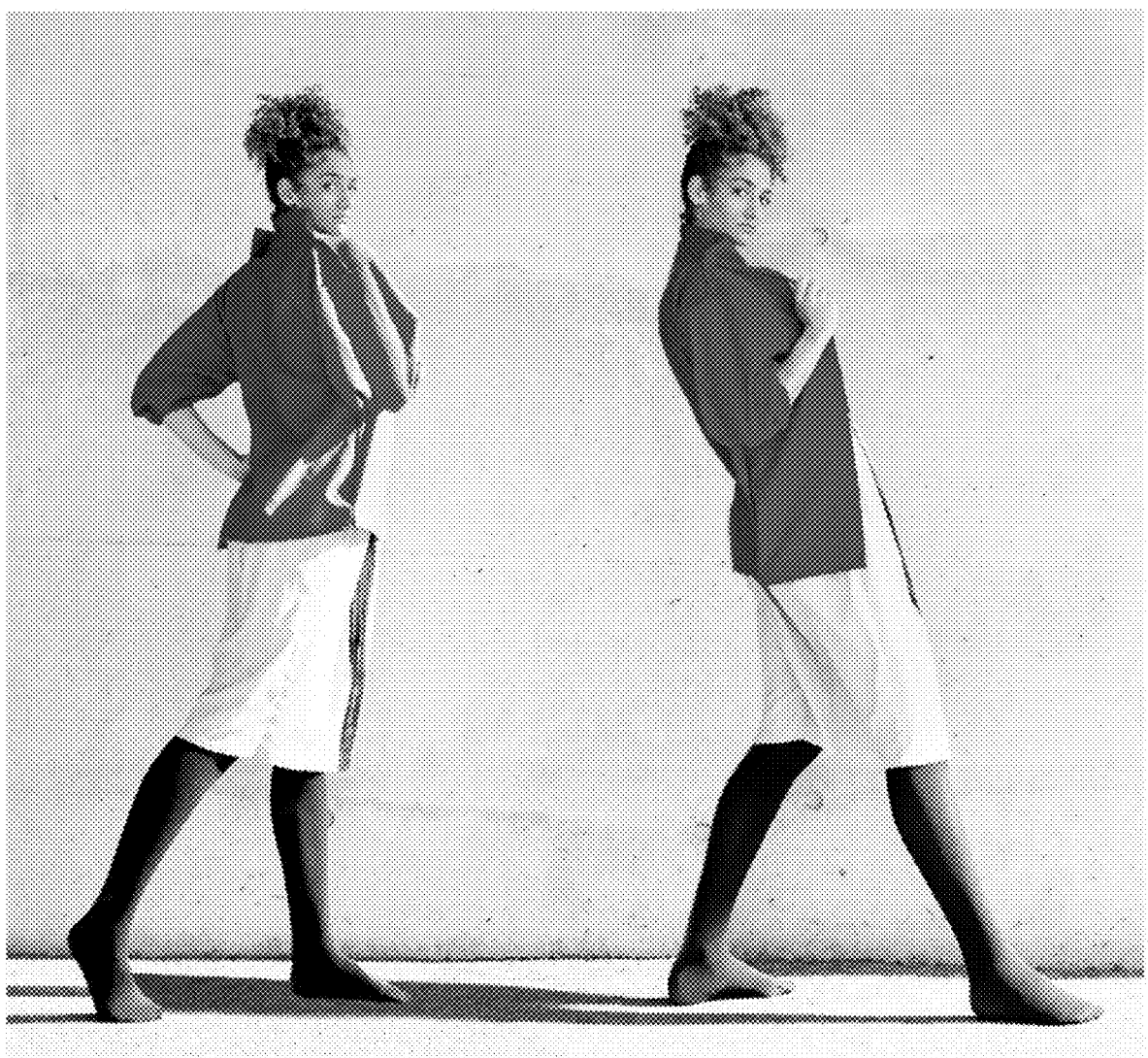
FIG. 3 illustrates the exemplary jacket of FIG. 2 in assembled form.

FIG. 3 illustrates the exemplary jacket of FIG. 2 in assembled form. The edges still fall to fit around the body, while having zero fabric waste.

Figure 4:
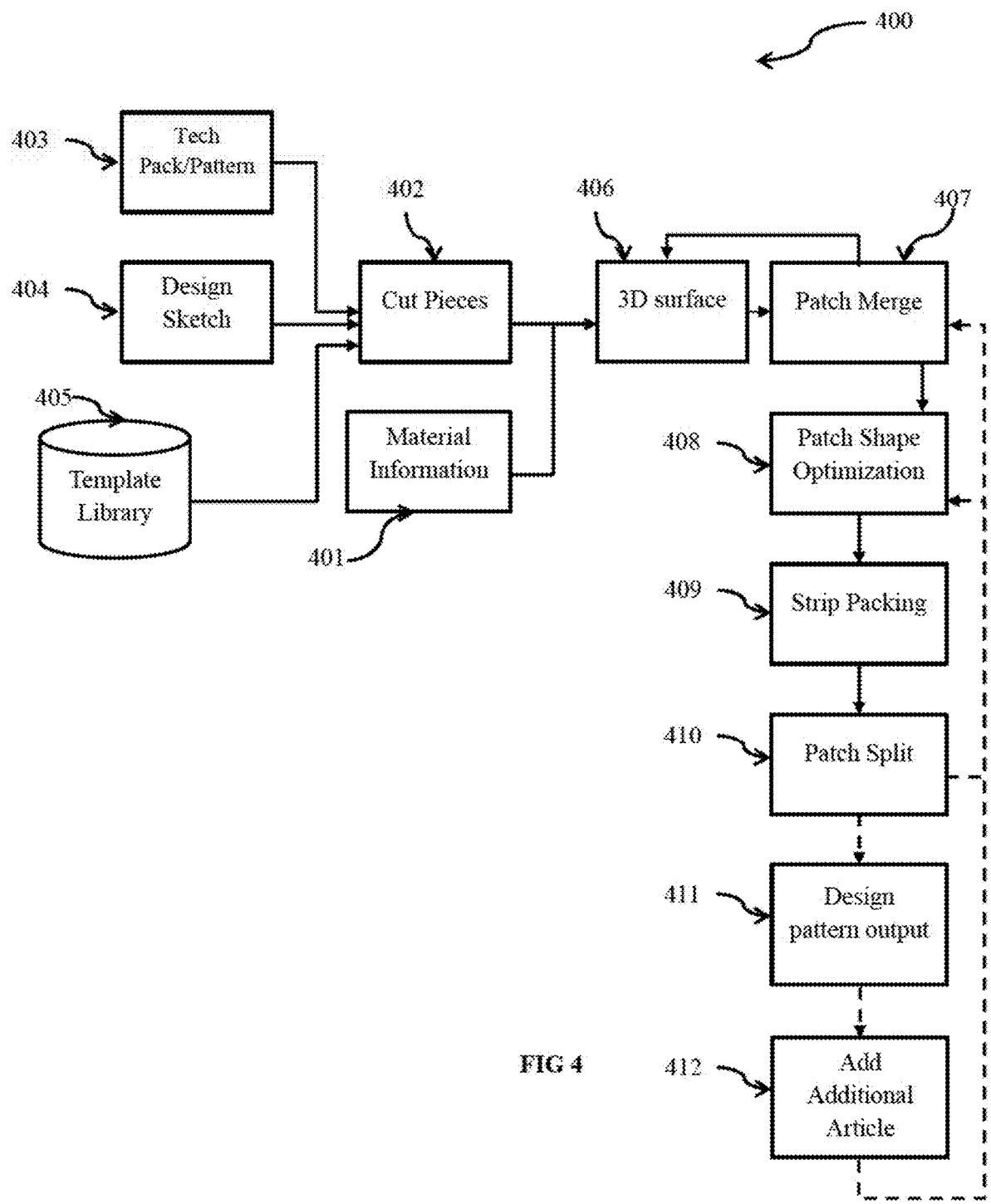
FIG. 4 illustrates a multi-task optimization method for reduction in fabric/material waste in material fabrication according to embodiments of the present disclosure.
Figure 4A:
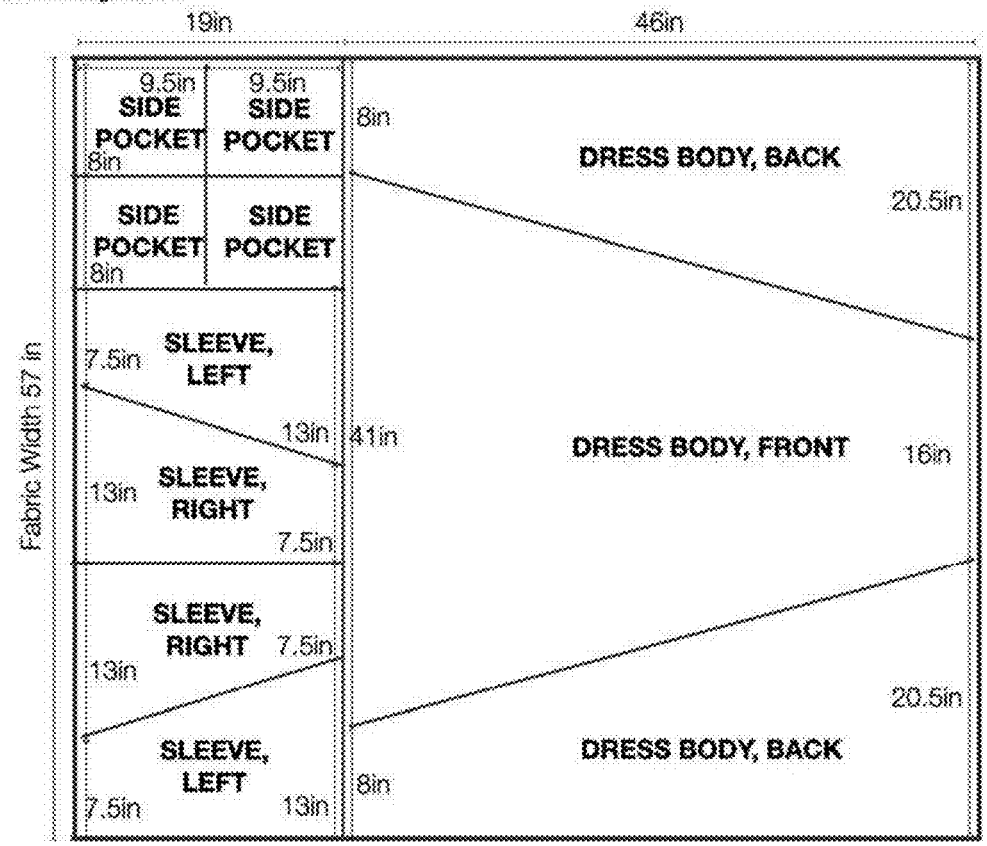
FIGS. 4a, 4b, 4c and 4d illustrate zero-waste designs across different sizes/body shapes for the same style.
Figure 4B:
Figure 4C:
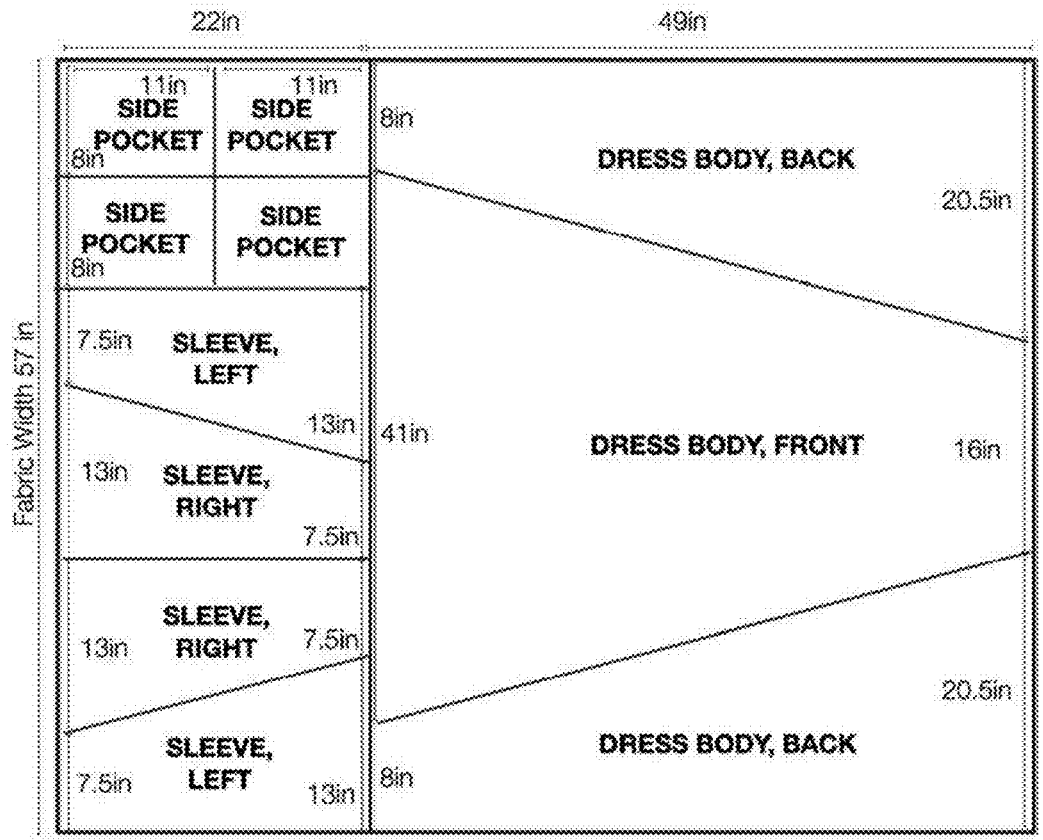
Figure 4D:
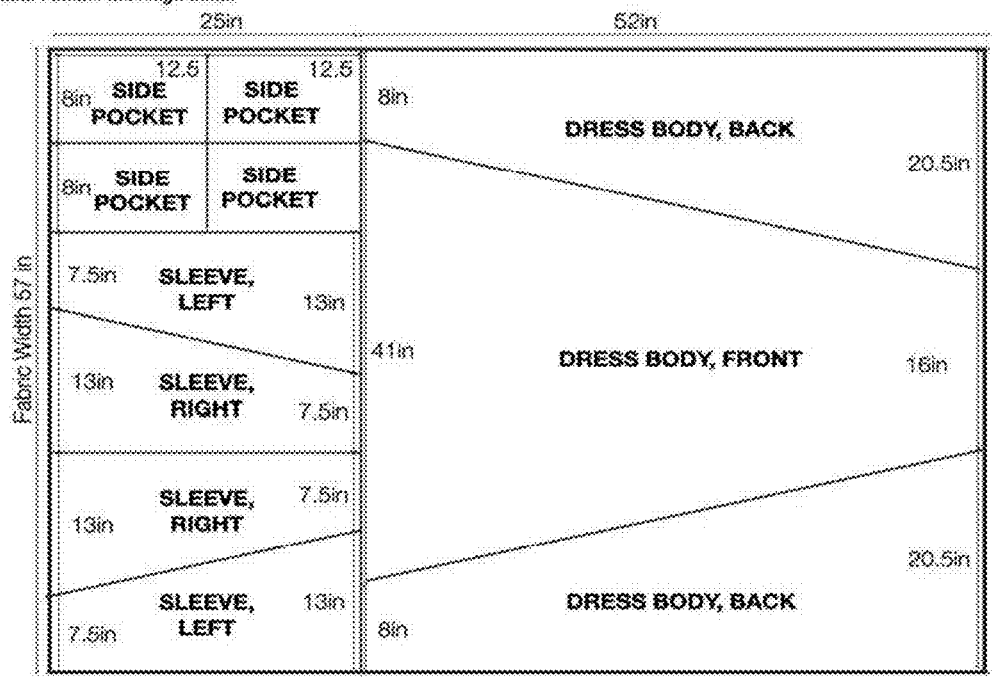

FIG. 4 illustrates a multi-task optimization method for reduction in fabric/material waste in garment(s) fabrication according to embodiments of the present disclosure. In particular, a design style is fit efficiently within the dimensions of the fabric/material with zero-waste. Multi-objective optimization is performed using patch split/merge, patch shape optimization, and a packing algorithm. Due to the multiple objectives and given varying business objectives, the results may be varied by: (i) prioritizing minimal desired design distortion while eliminating as much fabric/material waste as possible within the fabric/material dimensions; or (ii) prioritizing zero-waste while allowing the design to adapt more to fit within the fabric/material dimensions.

Referring to FIG. 4, the multi-task optimization method (400) for reduction in fabric/material waste comprises the steps of: providing one or more inputs required for material fabrication to a system (100), wherein the provided inputs include material information (401), cut pieces (402) that are either taken directly from a pattern/tech pack (403) or derived from a 2D/3D design (404) or design concept, and/or metadata indicating additional characteristics required for the garment fabrication, wherein metadata includes garment type (e.g., jacket, shirt) or presence of additional features (e.g., pockets). In one embodiment, materials may include fabrics as well as leather, plastic, or other materials suitable for garment, shoes accessory and furniture production and the material information (401) may include material type, weight, dimensions, description, orientation based on texture directions or prints, and length of the print. For irregular fabrics (e.g., leather from invasive species made to support ecosystems), a map of the fabric/material area may be included in addition to the dimensions.

A template or a plurality of relevant portions from multiple templates is retrieved from a template library (405) based on the provided inputs, wherein the template(s) contains a set of default fabric/material pieces that correlate with the drawings metadata including but not limited to 2D/3D sketch, pattern or tech pack. For example, a template for a T-shirt with a breast pocket will include a front and back piece, two sleeve pieces and a pocket piece. In some embodiments, the drawings and the garment type are provided to a learning system that is pre-trained to output the dimensions to be applied to each of the template cut pieces in order to achieve the design while ensuring that adjoining pieces have corresponding dimensions in order to provide a consistent stitching edge. Further, the default fabric/material pieces that correlate with the drawings metadata are scaled to the design sketch (404) subsequent to which a first 3D clothing surface (406) is generated by rendering an assembled garment on a virtual mannequin using the material information (401) and the cut pieces (402) including but are not limited to pattern, wherein the first 3D clothing surface (406) provides a perceptual constraint on the pattern optimization.

Subsequently, the first 3D clothing surface (406) and a second 3D clothing surface stemming from the original pattern are compared at each iteration of the optimization process till the distortion between the first 3D clothing surface (406) and the second 3D clothing surface is reduced to a minimum threshold value. In some embodiments, the distortion is measured as the chamfer distance between these two surfaces. All pairs of neighboring patches on the first 3D clothing surface (406) are checked, wherein a patch merge (407) for a pair of patches is performed if the curvature across the sewing edge is less than a predetermined threshold; and the merged edges are small enough to fit within the dimensions of the source fabric. The patch merging of the first 3D clothing surface (406) reduces the number of patches leading to fewer cuts and seams, thereby resulting in improved efficiency during garment manufacturing. To merge patches, the starting point and the ending point of edges are aligned. The two corresponding edges are discarded, to form a single patch. In some embodiments, all the curvatures of seams are sorted in ascending order, and the merge process proceeds from the flattest pair of pieces and proceeds towards the more curved.

Subsequent to patch merge (407), a patch shape optimization (408) is performed over the 2D fabric/material patch pieces, wherein the objective is to make the shape of each piece more regularized so fabric/material cutting is more efficient, and the pieces more easily fit with each other to minimize fabric/material waste. Each patch is represented as a set of pre-defined shapes (including straight lines or curves) such as but not limited to polygons assembled to reflect the curvature of the patch according to the first 3D clothing surface (406). Further, the curved segments of each patch are identified by splitting the patch along the pre-defined shape such as but not limited to polygon boundaries that have a sharp connection, wherein for each adjacent pair of curved segments, the boundary edge is down sampled by gradually reducing the number of vertices along the boundary. Down sampling the boundary edge of the curved segments is halted if the distortion of the first 3D clothing surface (406) reaches a pre-defined threshold value.

Subsequently, 2D strip packing (409) is performed for the optimized patch shape, wherein a minimum bounding box is computed for each piece after packing, following which the ratio of empty area for each bounding box is computed and the patches whose ratio exceeds a predetermined threshold value are selected, wherein patch splitting (410) is performed for the selected patches which are divided into smaller patches to achieve maximum space optimization. In some embodiments, a selected patch is split by cutting at each concave edge in order to eliminate the concavity and ensure that all the split pieces are convex. In various embodiments, a cuckoo search algorithm with pairwise clustering is applied for the task of strip packing (409). However, it will be appreciated that a variety of alternative algorithms may be employed, such as but not limited to a bottom-up left-justified algorithm; next-fit decreasing-height algorithm; Sleator's algorithm; reverse-fit algorithm; or Steinberg's algorithm. As a consequence of steps pertaining to patch merge (407), patch shape optimization (408), strip packing (409) and patch splitting (410), a design pattern output is generated in step (411).

Further, an additional garment (412) is incrementally increased subsequent to the patch splitting (410) until a zero or minimal waste configuration is obtained. The process of patch merge (407), patch shape optimization (408), strip packing (409) and patch splitting (410) is performed repeatedly until a zero or minimal waste permutation is determined with minimum fabric/material consumption, minimum cuts, and maximum 3D surface similarity compared to the second 3D clothing surface stemming from the original pattern. In some embodiments, the process of patch merge (407), patch shape optimization (408), strip packing (409) and patch splitting (410) may be repeated with a plurality of garments in order to optimize production of a set of garments together. For example, if a zero fabric/material waste design cannot be generated for a single garment (e.g., a T-Shirt), steps (407) to (410) may be repeated for two identical garments (or other articles) to be cut from the same cloth. In such embodiments, the cuts between garments are not subject to patch merging in step 407. It will be appreciated that the process as described in FIG. 4 prioritizes minimal design distortion while eliminating as much fabric/material waste as possible within the fabric/material dimensions. In additional embodiments, zero-waste is prioritized while allowing the design to adapt more to fit within the fabric/material dimensions.

In an alternative embodiment, when the initial 2D sewing pattern is in a compact form, a pattern adjustment technique is applied directly to the compact template to preserve the zero fabric/material waste property. To perform the pattern adjustment technique, handles over the pattern template (usually the corner of the cutting pieces) are annotated. During the pattern adjustment, any free movement of the corners in the design plan is allowed while subject to no self-intersection. The location of the corners is optimized so that the design parameters from the input sketch are best reflected in the dimensions from the 2D template. To preserve the feasibility of the manufactured design output, constraints on the dimensions are applied to regularize the design, wherein the constraints are represented as a set of linear in-equations of the corner locations.

FIGS. 4a, 4b, 4c and 4d illustrate zero-waste designs across different sizes/body shapes for the same style. For example, consider a long sleeve dress in a zero-waste design which is adjusted across sizes small (illustrated by FIGS. 4a and 4b), medium (illustrated by FIG. 4c) and large (illustrated by FIG. 4d). The pattern adjustment technique allows the zero fabric/material waste design to be scaled across different body or clothing measurements (e.g. chest circumference, top length of clothing) or shapes while maintaining zero fabric/material waste configuration contrary to the vast majority of ready to wear clothing designs, which are available in multiple standard sizes without the ability to be sized to specific measurements/shapes.

Figure 4F:
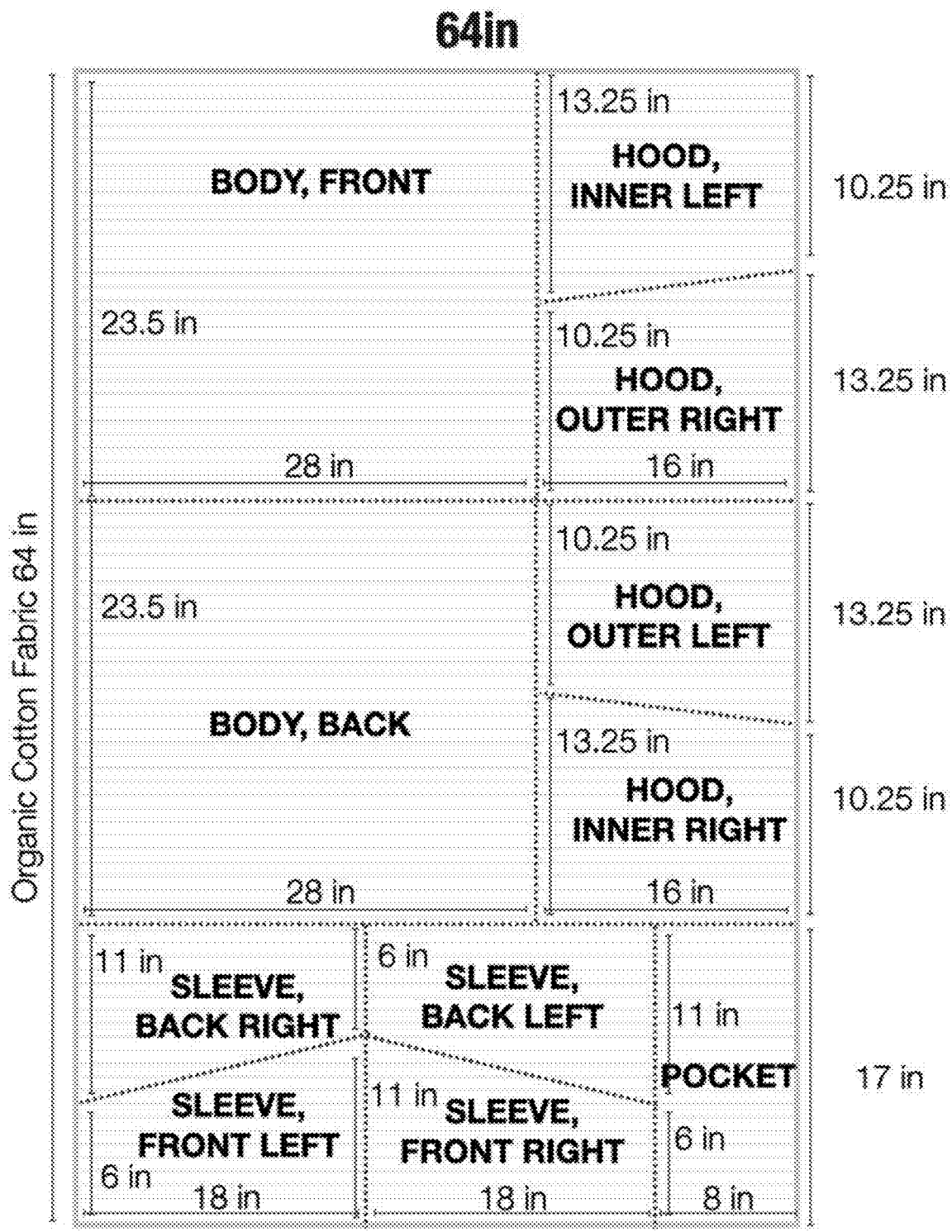
Figure 4G:
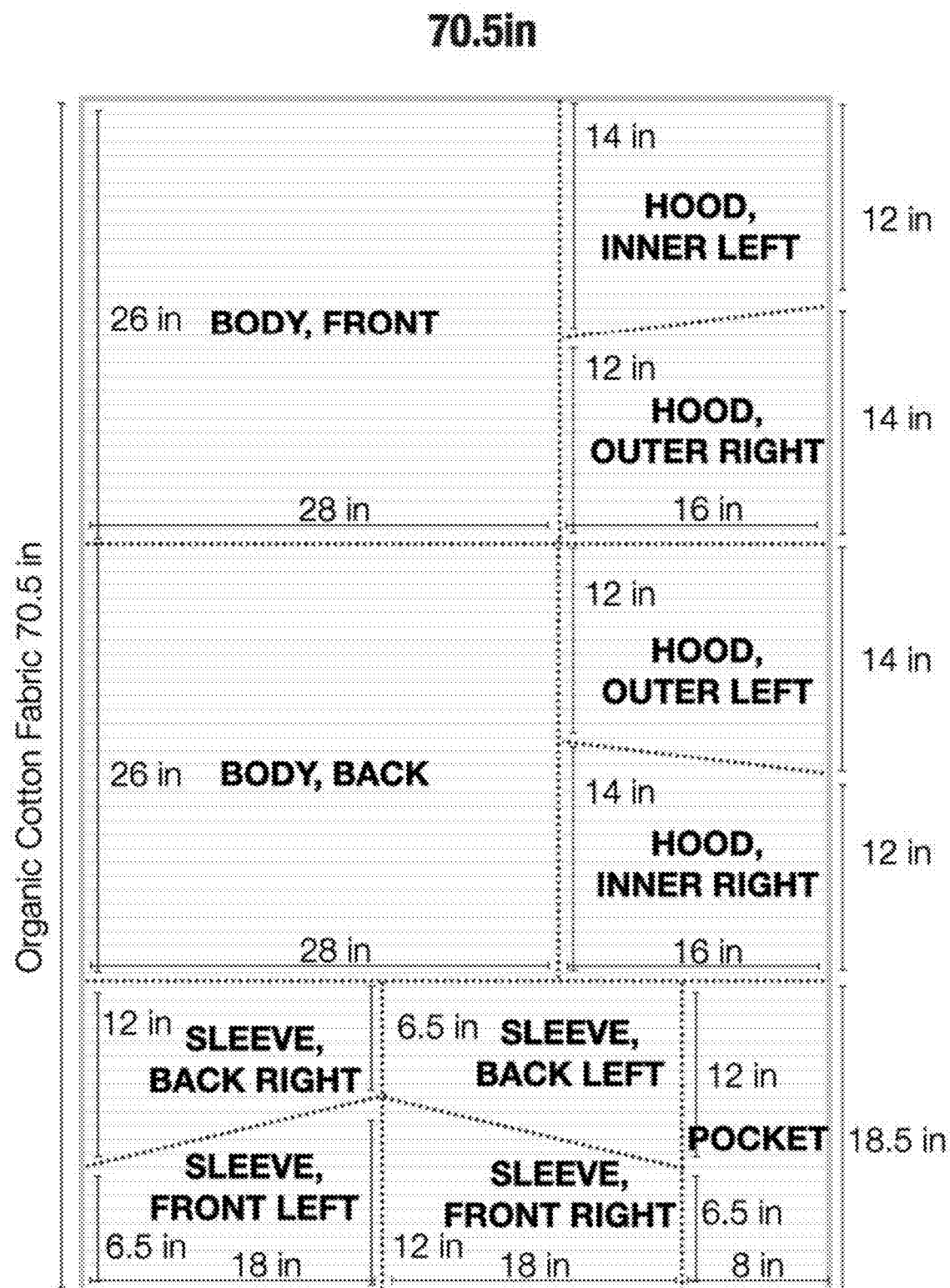

FIGS. 4e, 4f and 4g illustrate zero-waste designs across different fabric widths for the same style. Since brands and designers work with a plurality of suppliers, they often face the challenge of variable fabric width despite using the same material. Even within the same fabric supplier, there are often 0.5 in-2 in variations in widths or usable widths from one piece of fabric to another thereby resulting in fabric wastage. The pattern adjustment technique provided in the alternative embodiment of the present invention allows a given zero-waste design to be scaled across different fabric widths or material dimensions. For example, consider a zero fabric waste hoodie design which is adjusted to maintain zero fabric waste across three different fabric widths such as a width of 61 inches (illustrated by FIG. 4e), 64 inches (illustrated by FIG. 4f) and 70.5 inches (illustrated by FIG. 4g). The pattern adjustment technique allows the zero fabric waste design to be scaled across different fabric widths thereby enabling scalability across rolls of fabric with the same widths.

Figure 4H:
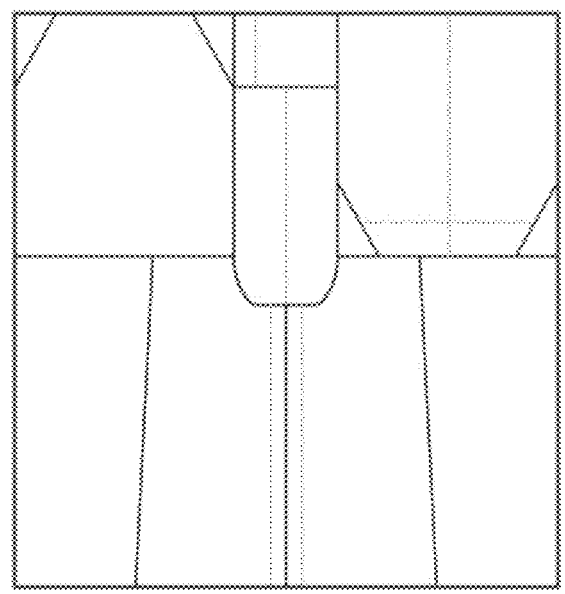
FIG. 4h illustrates a zero-waste design achieved with curves.

In another embodiment of the present invention, a zero-waste design may be achieved with curves as illustrated in FIG. 4h. The multi-task optimization method disclosed in the present invention may be applied to curves which are treated as a combination of straight lines. The present embodiment is highly applicable for the purposes of tailoring and fitting.

Figure 4I:
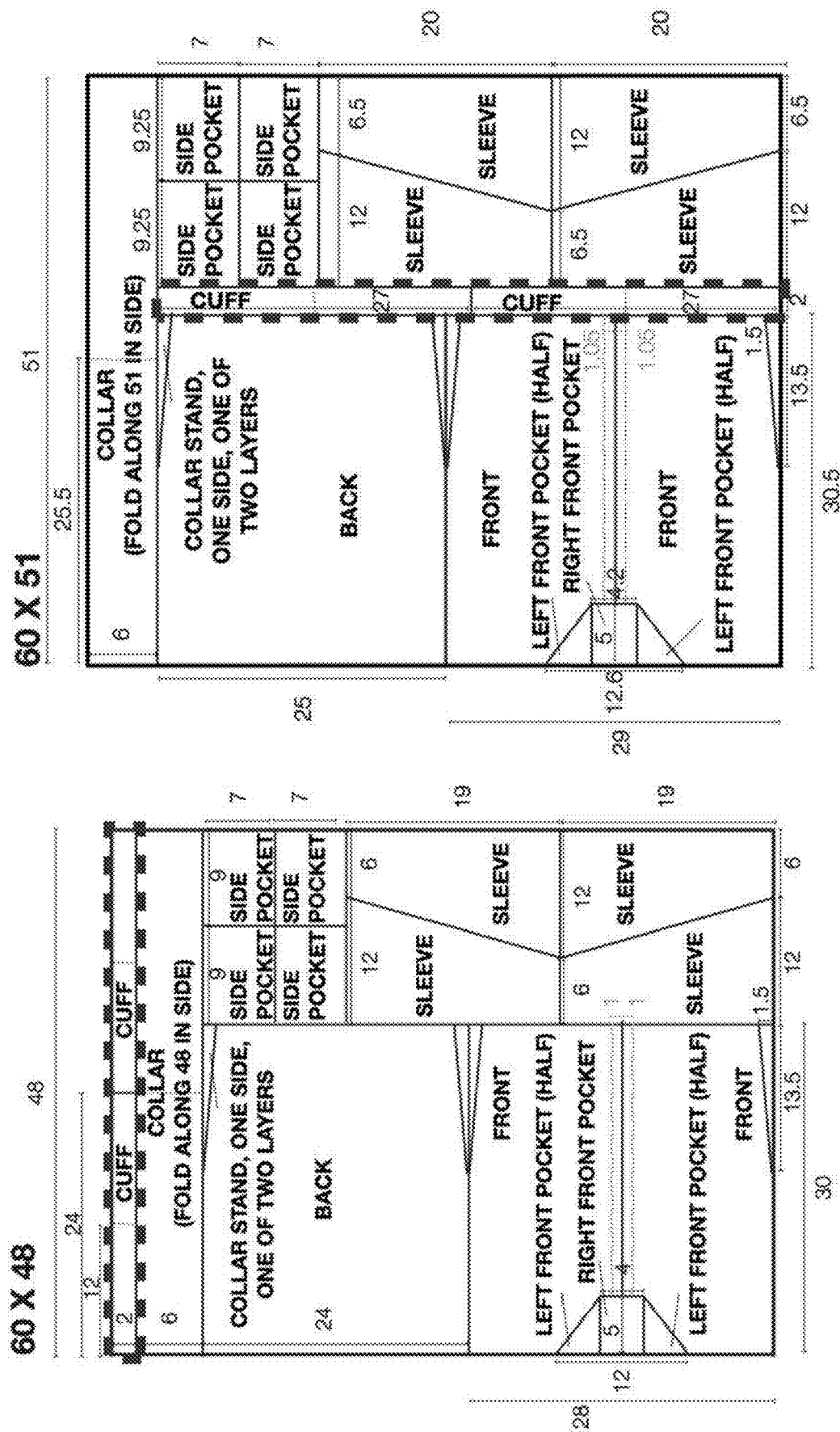
FIG. 4i illustrates a zero-waste design which may be achieved by transposing and resizing the different sections of a given design pattern to obtain another zero-waste design pattern output.

FIG. 4i illustrates a zero fabric waste design which may be achieved by transposing and re-sizing the different sections of a given design pattern to obtain another design pattern output which may be of a different size and pattern. In one example, a jacket with dimensions (in inches) 60*48 is considered. Using the multi-task optimization method disclosed in the present invention, particular sections such as the cuff of the given jacket can be transposed, rearranged or re-sized strategically at different sections to increase the size of the jacket from 60*48 inches to 60*51 inches. This allows for the same zero-waste design style for different body or clothing measurements.

Figure 5:
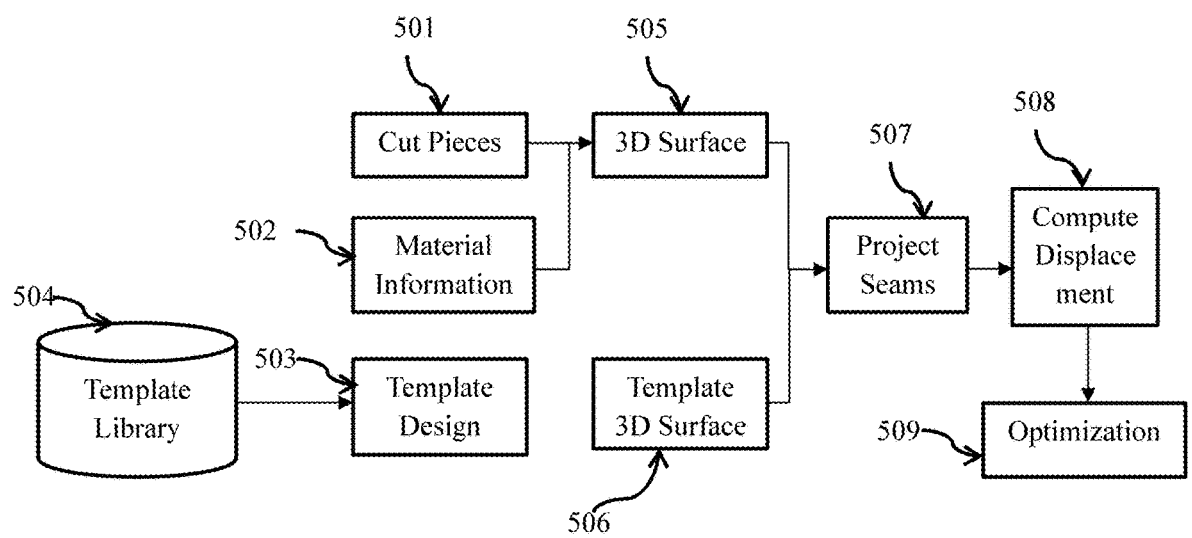
FIG. 5 illustrates a process for reduction in fabric/material waste in garment(s) fabrication according to embodiments of the present disclosure.

FIG. 5 illustrates a process for reduction in fabric/material waste in material fabrication according to embodiments of the present disclosure. To reduce the computation complexity of the patch optimization and 2D strip packing in the waste reduction first approach, existing zero-waste designs are used as templates. A parametric model is established to deform the template design to best approximate the target design while keeping the fabric/material waste to zero during such operation. The process (500) comprises the steps of providing an information pertaining to multiple cut pieces (501) and a material information (502) to the system (100) and categorizing a target article into a plurality of pre-defined styles such as but not limited to shirt, pants, jackets and the like. Further, a zero-waste design template (503) is obtained from the template library (504), wherein the zero-waste design template (503) is not limited to a single template but also includes a plurality of relevant portions from multiple templates which may be selected based on the pre-defined style of the target article.

As described in FIG. 4, a 3D clothing surface (505) and a template 3D clothing surface (506) are generated, wherein the 3D clothing surface (505) is generated by rendering an assembled garment on a virtual mannequin. Subsequently, the zero-waste design template (503) is re-scaled based on the generated 3D clothing surface (505) and template 3D clothing surface (506) to enable precise alignment of the generated 3D clothing surface (505) and template 3D clothing surface (506). In particular, a scale factor may be assigned to each edge (seam) of the pieces in the zero-waste design template (503), wherein the scale factor for each edge (seam) in the zero-waste design template (503) is provided as the ratio between each 3D curve on the template 3D clothing surface (506) and the generated 3D clothing surface (505). Each edge (seam) in the zero-waste design template (503) has a corresponding 3D curve in the corresponding template 3D clothing surface (506). Thus as shown in FIG. 5 when projecting the edges (seams) (507) of the zero-waste design template (503) a displacement can be computed (508) between the generated 3D clothing surface (505) and the template 3D clothing surface (506). The 3D clothing surface (505) and template 3D clothing surface (506) are aligned with each other, for example by a 3D registration such as an iterative closest point algorithm as per one embodiment of the present invention.

Subsequently, the closest point in the generated 3D clothing surface (505) is retrieved by sampling points along the 3D curve of the zero-waste design template (503). Further, the range of displacement (508) between the generated 3D clothing surface (505) and template 3D clothing surface (506) is minimized, wherein the minimization of the range of displacement may be achieved using a local greedy search algorithm as per one embodiment of the present invention. In some embodiments, the mapping from the displacement of a certain cut to the length change for all the edges in the tech pack or pattern may be determined via training a shallow neural network. In some embodiments, the neural network takes cut displacement in 3D as input and provides the edge length for each piece in the corresponding tech pack or pattern as output. In some embodiments, the displacement is randomly sampled, and the edge length is calculated to generate training data.

Further, the average edge length between the zero-waste design template (503) and the target article is minimized using a closed form optimization (509), wherein the closed form optimization for minimizing the average edge length between the zero-waste design template (503) and the target article preserves the design space in the zero-waste domain, thereby guaranteeing a zero fabric/material waste output. In one embodiment, a trust region algorithm is used for minimizing the average edge length between the zero-waste design template (503) and the target article using a closed form optimization (509). As with method (400), in some embodiments, this process (500) may be repeated with a plurality of garments to optimize production of a set of garments together.

Example 1 indicates a zero-fabric waste hoodie using leftover organic cotton and ribbing fabric, for fabrics having specific orientation. This example demonstrates the uniqueness of the fabric/material-first zero-waste design method. In particular, the methods described above with regard to FIG. 4 results in a zero-fabric waste hoodie that uses 25% less in fabric consumption, is simpler in construction than traditional hoodies, and is not basic in silhouette (i.e., not a sari or flowy kimono).

The inputs to zero-waste method (400) included fabric information and design information. The fabric information included organic cotton fabric 70.5 in in width, with lines running perpendicular to the width of the fabric. Also ribbing fabric 45 in in width used for cuffs and bottoms of the hoodie, with more pronounced lines running perpendicular to the width of the fabric. Design information included the hoodie style including design sketch and hoodie tech pack.

Fabric information was provided according to step (401). Target hoodie cut pieces as illustrated in FIG. 6, were provided according to step (402). Referring to FIG. 6, the key pieces will be apparent, including front and back body pieces, sleeve pieces, hood pieces and a pocket piece. Waste is depicted by the filled area between pieces. A 3D surface is generated according to step (406). In this example, a S/M size was initially considered, with initial measurement variation allowances assigned for each piece based on the desired 3D clothing surface. Though standard sizes are considered in this example, the disclosure of the present invention provides the flexibility to customize the garments, shoes, accessories, etc. to measurement and sizes as required by the end-user. In this example, the body length and pocket length allow for the most variation, the sleeves allow for the least. The 3D clothing surface also reveals dependencies across the pieces. The front and back body pieces are attached to the ribbing piece, the sleeves are attached to ribbing cuff pieces. This creates groupings that give combined measurement variation allowances that supersede the variation allowances of each specific piece. In this way, growth or expansion of the garment beyond sizing constraints is avoided in later steps. In this example, it was determined in step (407) that no patch merge was possible.

Patch shape optimization was performed according to step (408). The front and back body panels are turned into rectangles that span over the shoulders and extend up and down to the hips. The dimensions of the front and back body panels are 26 in across×28 in up and down for S/M. (26 in ×31 in for L/XL). Packing is performed according to step (409). For the front and back body pieces, placement must be oriented perpendicular to the width of the organic cotton fabric so the fabric lines can run vertically up and down the body. This is in accordance with industry standards. Placement also aligns with a fabric edge, maximizing the remaining spaces to fit the sleeves of the hoodie—the longest remaining pieces—within the width of the fabric. For packing the remaining pieces (sleeves, hood pieces, pocket), the wider hood pieces would be most efficient when placed under the wider body pieces, and the sleeves would be most efficient when used to fill the remainder of the fabric width.

Split/merge is performed according to steps (410), (407), and iterative shape optimization is performed according to step (408). The sleeves are split so that they are optimized into right trapezoids. Shape optimization also turns the hood shapes into right trapezoids in order to fit the hood and longer sleeves while taking up less fabric length (i.e., reducing fabric consumption). Packing is reapplied according to step (409), which places the pocket in the remaining slot on the bottom right. The iterative approach was continued to ensure a minimum of cuts/complex cuts and a minimum of fabric consumption while maintaining zero-waste with maximum adherence to the target design.

In this example, the resulting design was compared to the target design to ensure a similar silhouette. To accomplish this, the silhouettes in the 3D surface rendering are compared. In this example, it was revealed that the hood was sharp, so the hood design was further iterated to add a seam to ensure a curved back of the hood. On further comparison, it was revealed that the total sleeve and cuff length was too short. If the sleeve length were increased, it would force the pocket height outside of the allowed measurement parameters. The cuff height was instead increased.

Figure 7:
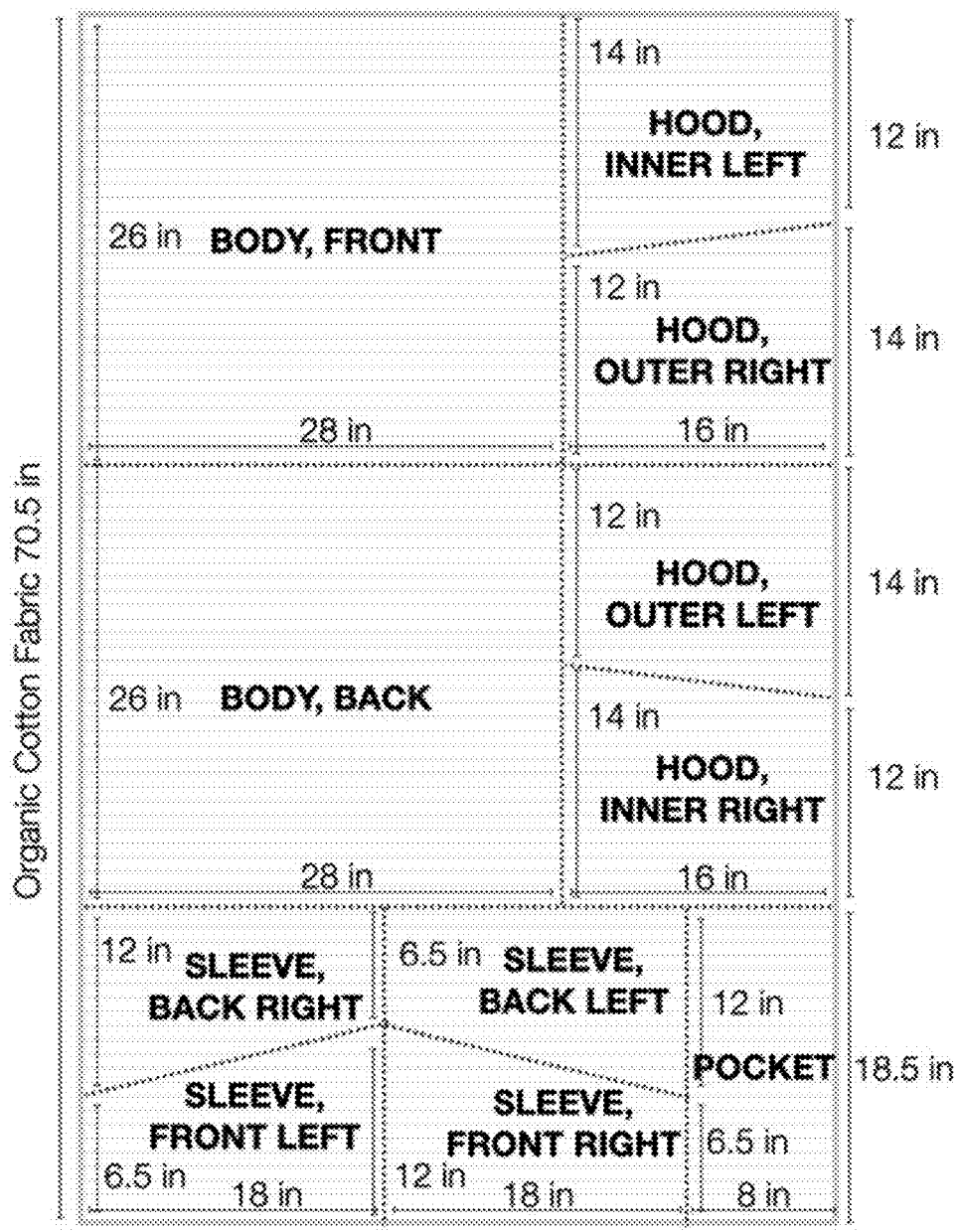

FIGS. 7 & 8 illustrate exemplary hoodie cuts generated according to an embodiment of the present disclosure. Referring to FIG. 7, the resulting fabric cuts are shown. This design uses 1.22 yards, 25% less than the input design. In addition to the main components of the garment, the cuffs and bottom body hems were optimized to use ribbing fabric that is 45 in in width. There are two wrist cuff pieces and one long body hem piece for each hoodie. The first iteration determined that this is impossible to be done with zero fabric waste as the body piece takes up too much of the width to make room for the two cuffs, the cuffs are wider than the body piece, and therefore the resulting rectangles cannot fit inside a piece of rectangularly cut fabric without waste. Accordingly, in this example, multiple units of body hems and cuffs were combined to be made at once to increase fabric use efficiency. The resulting cuts in FIG. 8 illustrate the final placements of zero-waste hoodie ribbing fabric. For additional sizes of the garment (L/XL size), the process was repeated with new variation allowances with new upper and lower bounds.

Figure 9:
FIG. 9 illustrates an exemplary jacket design.

Example 2: In this example, the zero-waste first method (500) of FIG. 5 was employed. The target jacket is illustrated in FIG. 9. This design uses roll end leftover denim, which are narrow rectangular denim fabric pieces that remain at the end of fabric rolls. Usually, this roll end material is discarded as it is too small for another production run but is used here as the area constraint to construct an original zero-waste design. The design sketch (provided in FIG. 9) was provided according to step (404). The jacket style was deconstructed into fabric pieces based on the traditional jacket style category to obtain cut pieces (501), including the front and back body pieces, collars, back support, sleeves, cuffs, back text piece, and pockets. Material information was provided according to step (502), which in this case is roll end denim pieces, which are 60 in ×17-18 in narrow rectangles. A reference zero fabric waste jacket template or a plurality of relevant portions from multiple templates were pulled from the template library (504). 3D clothing surfaces (505) & (506) were constructed for both jacket versions, with initial measurement variation allowances for each piece. Based on template library (504), the body length/width and pocket length allow for the most variation, the sleeve widths and collars allow for the least. The sleeves are attached to cuff pieces. This creates groupings that give combined measurement variation allowances that supersede the variation allowances of each specific piece.

Shape optimization is used to simplify the front body panels into two hexagons (or a combination of two trapezoids) that span over the shoulders and extend up and down to the waist. The process of shape optimization is repeatedly performed with the application of patch split or patch merge thereby transforming the collar and neck back support pieces into triangles. Further packing is performed for the front panels, wherein due to the narrowness of the denim fabric, the panels can only fit side by side along the width of the denim fabric. The leftover areas can pack optimized triangular shapes for the collar and neck back support. The back panels are similar to the front panels but with a smaller lower bond for width and without the front opening. In packing, this translates to mirroring of the previous structure on a second piece of denim fabric, but with remaining fabric for the collar and back text piece. It must be duly noted that the back text piece is shorter than the remaining fabric, due to which the process is readjusted to fit two back text piece on each of the denim fabric.

The final denim piece is used to pack the remaining pieces, which are mostly sleeves. The sleeves are packed along the corner edges to allow for enough remaining width to fit the cuffs and pocket pieces. Shape optimization is re-applied to turn cuff and pocket pieces into rectangles that fit into the remaining fabric. It is determined that pocket pieces can have the most variation in dimensions and are therefore packed at the end to take up the remaining fabric. Placements, shapes, and potential piece merges are iterated to ensure minimum cuts with maximum fabric use efficiency. The look of the resulting design is compared to the target design to ensure a similar silhouette as the desired jacket style. Iterate further until style aligns well with the desired jacket.

Figure 10A:
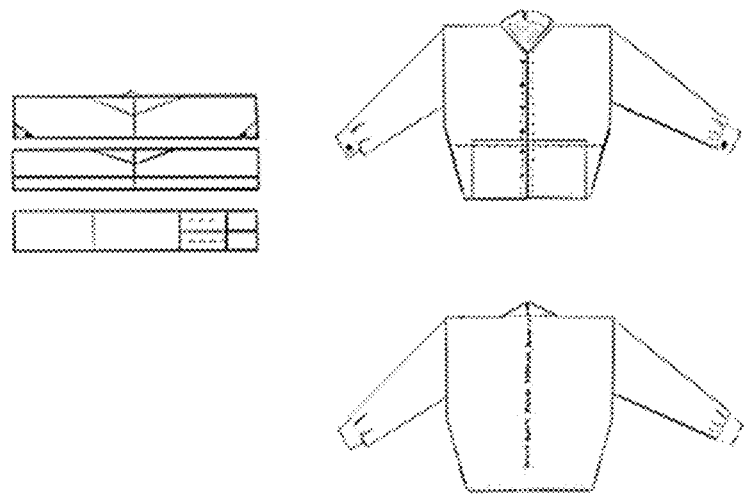
FIG. 10a illustrates exemplary jacket cuts generated according to an embodiment of the present disclosure.
Figure 10B:
FIG. 10b illustrates a finished product of the jacket whose design sketch was provided in FIG. 9.

FIG. 10a illustrates exemplary jacket cuts generated according to an embodiment of the present disclosure. FIG. 10b illustrates a finished product of the jacket whose design sketch was provided in FIG. 9.

Example 3 indicates a zero-material waste shoe design using multiple fabrics and material pieces. In this example, the same fabric first principle applies as in the above garment examples. The different fabrics and material pieces required for each shoe are mapped, and then the fabric/material shapes and placements are optimized using shape optimization, split/merge, and packing. Shoe productions are often done in batches, allowing for additional zero-waste opportunities for packing multiple shoe pieces together within a piece of fabric/material. It will be appreciated that the same process can be applied to furniture or other interior objects like car seats made with materials including fabrics, wood, and/or foam as well, for example yielding zero-waste sofas, or zero fabric/zero leather waste car seat.

Example 4 indicates a zero-material waste apparel using multiple fabrics. The fabric first methods provided herein can be applied to apparel using multiple fabrics. To accommodate multiple fabrics, the parts required for each fabric are mapped, and then the design is iterated within each fabric to ensure zero-waste across materials.

Example 5 indicates a zero-material waste apparel with specific print alignments. Oftentimes, garment fabrics have specific prints that must be placed in certain parts of the garment (e.g., a flower print on the front of a dress). This can be achieved through the fabric/material first methods described herein by first locking the placement (but not the shape) of specific fabric piece(s), then optimizing shape, packing and splitting/merging the remaining fabric pieces around that first piece.

Example 6 indicates multiple zero material waste designs done at once. The methods provided herein can be applied to design multiple styles at once (e.g., a bag and a shirt are designed collectively so that together, they use fabric without waste in between). This is particularly relevant when the styles are made at the same manufacturing facility from the same rolls of fabrics or from the same material sources. In this case, all styles are deconstructed into patch pieces, split/possible merge within one style, patch shape optimization, and packing are performed to all patches collectively.

In addition to the examples above, it will be appreciated that several variations are available. In various embodiments, the end design does not take up the entire fabric width. For example, the design may be configured to take up a fraction of the fabric width (e.g., ½ of fabric width), so that multiple zero fabric waste designs or parts can fit across the width of the fabric each time (e.g., in this example two). In various embodiments, the inputs include patterns, tech packs, any 2D sketches, and/or 3D art. Across all these inputs, different patch pieces are separated out to perform further optimization. It will be appreciated that while the above examples focus on garments, the methods provided herein are applicable to various soft goods, including but not limited to apparel, bags, accessories, furniture and shoes. These methods may also be applied to zero material waste designs of any products consisting of hard material.

Various embodiments provided herein use a learning system, or machine learning model. In some such embodiments, a feature vector is provided to a learning system. Based on the input features, the learning system generates one or more outputs. In some embodiments, the output of the learning system is a feature vector. In some embodiments, the learning system is pre-trained using training data. In some embodiments, training data is retrospective data. In some embodiments, the retrospective data is stored in a data store. In some embodiments, the learning system may be additionally trained through manual curation of previously generated outputs.

In some embodiments, the learning system comprises an SVM. In other embodiments, the learning system comprises an artificial neural network. In some embodiments, the learning system is a trained classifier. In some embodiments, the trained classifier is a random decision forest. However, it will be appreciated that a variety of other classifiers are suitable for use according to the present disclosure, including linear classifiers, support vector machines (SVM), or neural networks such as recurrent neural networks (RNN). Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

Figure 11:
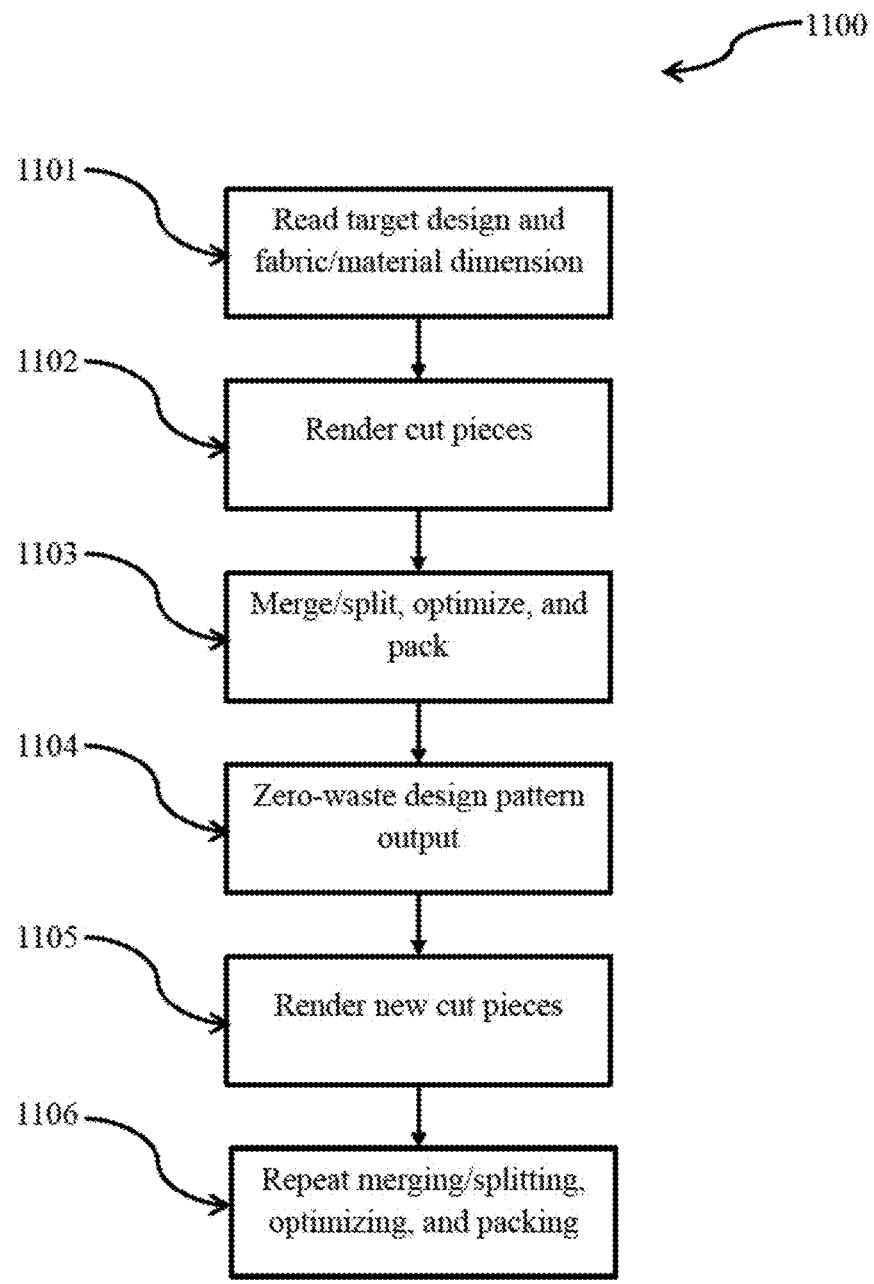
FIG. 11 illustrates a method of generating a garment(s) design according to embodiments of the present disclosure.

FIG. 11 illustrates a method of generating a zero-waste design pattern according to embodiments of the present disclosure, wherein the method (1100) comprises the steps of accepting inputs which may be fabric/material dimensions or a target design comprising a first plurality of cut pieces including but are not limited to pattern in step (1101). In an embodiment of the invention, the target design input is not limited to cut pieces but also extends to input from a template library or a 2D or 3D design. Subsequently a first 3D clothing surface is rendered from the first plurality of cut pieces from the target design input in step (1102). Step (1103) includes merging/splitting, optimizing and packing the first plurality of cut pieces including but are not limited to pattern, iteratively to yield a second plurality of cut pieces including but are not limited to pattern. In step (1104), a zero-waste design output is obtained as a consequence of step (1103) in which the steps of merging/splitting, optimizing and packing the first plurality of cut pieces was performed. Further, a second 3D clothing surface is rendered from the second plurality of cut pieces in step (1105). In step (1106), the first 3D clothing surface and second 3D clothing surface are compared, and the tasks of merging/splitting, optimizing and packing are performed iteratively when a distortion between the first 3D clothing surface and second 3D clothing surface exceeds a pre-defined threshold value.

Figure 12:
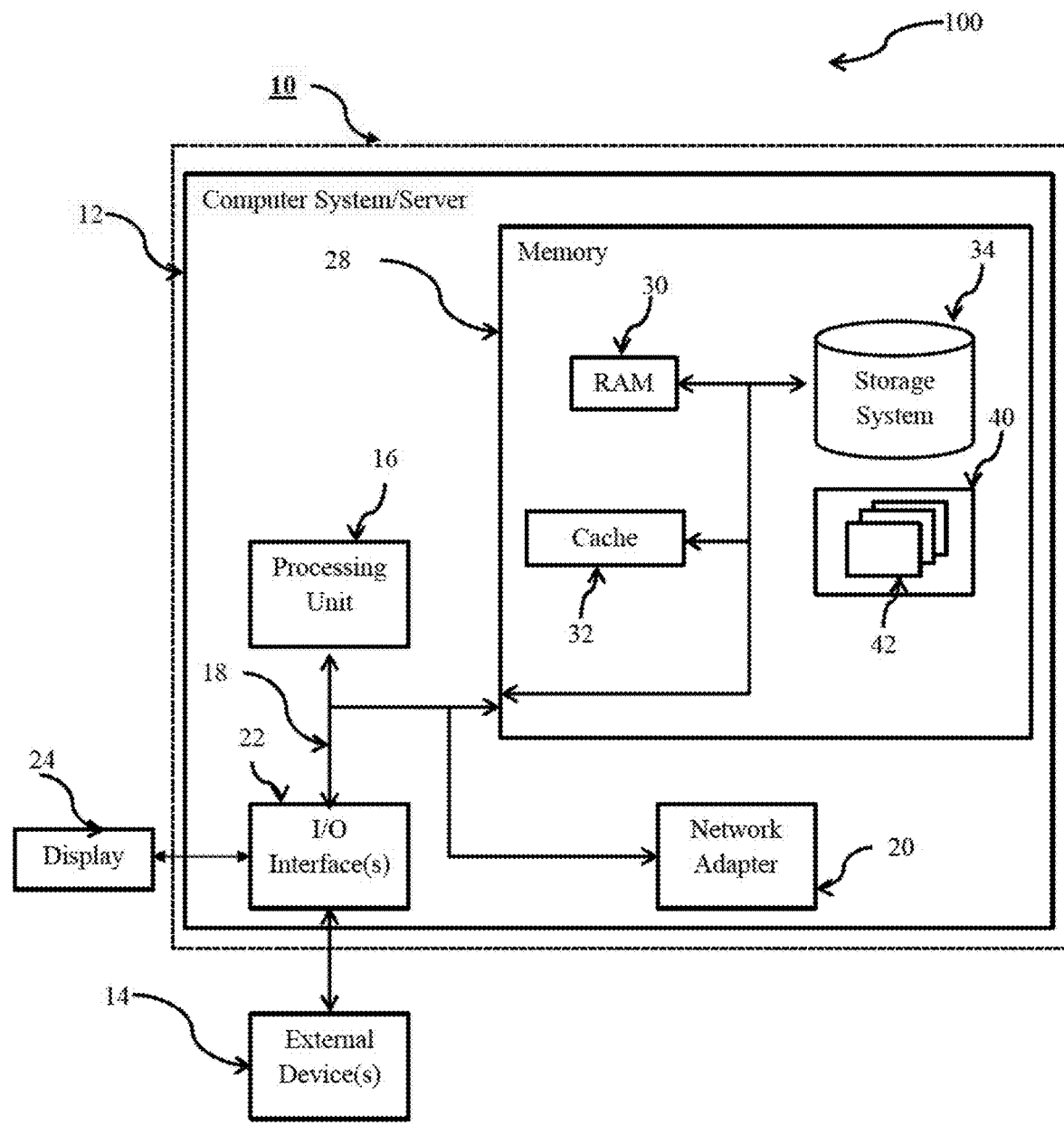
FIG. 12 illustrates a block diagram of a system for reduction of fabric/material waste in a material fabrication.

FIG. 12 illustrates a block diagram of a system for reduction of fabric/material waste in a material fabrication, wherein the system (100) comprises a computing node (10) which comprises a computer server (12) that is capable of executing a process for reduction in the fabric/material waste in material fabrication. The computer server (12) comprises: (i) a system memory (28) which is a computer readable storage medium configured with one or more program modules (42) for performing a multi-task optimization method for reduction in the fabric/material waste in the material fabrication, wherein the system memory (28) includes computer readable media in the form of removable memory, non-removable memory, volatile memory and non-volatile memory; (ii) one or more processing units (16), which is capable of executing the program modules (42) stored in the system memory (28), wherein the processing units (16) sequentially executes the multi-task optimization method comprising the steps of a patch merge, a patch shape optimization, a strip packing, and a patch split which are performed iteratively to improve the packing efficiency of garments; and (iii) a network adapter (20) for enabling a wired or wireless communication between the components of computer server (12) through a bus (18), wherein the computer server (12) communicates with one or more external devices (14) through Input/Output (I/O) interfaces (22). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

The computing node (10) is only one example of a suitable computing node and is not intended to suggest any limitation as to the scope of use or functionality of embodiments described herein. Regardless, the computing node (10) is capable of being implemented and/or performing any of the functionality set forth hereinabove. Examples of well-known computing systems, environments, and/or configurations that may be suitable for use with computer server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer server (12) may be described in the general context of computer system-executable instructions, such as program modules, being executed by a computer system. Generally, program modules may include routines, programs, objects, components, logic, data structures, and so on that perform particular tasks or implement particular abstract data types. The computer server (12) may be practiced in distributed cloud computing environments where tasks are performed by remote processing devices that are linked through a communications network. In a distributed cloud computing environment, program modules may be located in both local and remote computer system storage media including memory storage devices. The computer server (12) typically includes a variety of computer system readable media. Such media may be any available media that is accessible by the computer server (12), and it includes both volatile and non-volatile media, removable and non-removable media.

The computer server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus (18) by one or more data media interfaces. As will be further depicted and described below, the system memory (28) may include at least one program product having a set (e.g., at least one) of program modules that are configured to carry out the functions of embodiments of the disclosure.

The system memory (28) can include computer system readable media in the form of volatile memory, such as Random Access Memory (RAM) (30) and/or cache memory (32). A program/utility (40), having a set (at least one) of program modules (42), may be stored in the system memory (28) by way of example, and not limitation, as well as an operating system, one or more application programs, other program modules, and program data. Each of the operating systems, one or more application programs, other program modules, and program data or some combination thereof, may include an implementation of a networking environment. The program modules (42) generally carry out the functions and/or methodologies of embodiments as described herein.

The computer server (12) may also communicate with multiple external devices (14) such as a keyboard, a pointing device, a display (24), etc., a plurality of devices that enable a user to interact with the computer server (12); and/or any devices (e.g., network card, modem, etc.) that enable computer server (12) to communicate with one or more other computing devices. Such communication can occur via Input/Output (I/O) interfaces (22). Still yet, computer server (12) can communicate with one or more networks such as a local area network (LAN), a general wide area network (WAN), and/or a public network (e.g., the Internet) via network adapter (20). It should be understood that, although not shown, other hardware and/or software components could be used in conjunction with computer server (12). Examples, include, but are not limited to microcode, device drivers, redundant processing units, external disk drive arrays, RAID systems, tape drives, and data archival storage systems and so on.

The present disclosure may be embodied as a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A multi-task optimization process for generating a zero-waste design pattern and reduction in waste of a source fabric/material, comprising a first process comprising the steps of:
   a) providing one or more inputs required for material fabrication to a system (100), wherein the provided one or more inputs include material information (401), a plurality of cut pieces (402) that are either taken directly from a pattern or a tech pack (403) or derived from a 2D/3D design sketch (404), and a metadata indicating one or more characteristics required for the material fabrication;
   b) retrieving a template or a combination of template parts from a template library (405) based on one or more inputs, wherein the template contains a set of default fabric/material pieces that correlate with the metadata;
   c) scaling the set of default fabric/material pieces that correlate with the metadata to the pattern or the tech pack (403) or the 2D/3D design sketch (404);
   d) generating a first 3D surface (406) by rendering an assembled garment on a virtual mannequin using the material information (401) and the cut pieces (402), wherein the first 3D surface (406) provides a perceptual constraint on the multi-task optimization of the pattern;
   e) comparing the first 3D surface (406) with a second 3D surface stemming from the pattern or the tech pack (403) or the 2D/3D design sketch (404) to determine the distortion and iterating the comparison, until distortion between the first 3D surface (406) and the second 3D surface is reduced to a minimum threshold value;
   f) checking one or more pairs of neighboring patches on the first 3D surface (406), wherein a patch merge (407) for a pair of patches, each patch merge forming a material patch piece, is performed if:
      i) a curvature across at least one sewing edge is less than a predetermined threshold; and
      ii) the merging of two of the at least one sewing edge are small enough to fit within a dimension of the first 3D surface (406);
   g) performing patch shape optimization (408) over at least one material patch piece, wherein each material patch piece is represented as a set of pre-defined shapes assembled to reflect curvature of the material patch piece according to the first 3D surface (406);
   h) identifying the curvature of each material patch piece by splitting the material patch piece along at least one boundary having a sharp connection, wherein for each adjacent pair of the curvature of the material patch piece, each boundary is down sampled by gradually reducing the number of vertices along each boundary;
   i) performing a 2D strip packing (409) to optimize a shape of the material patch piece, wherein a minimum area of a bounding box is computed for each material patch piece after packing; and
   j) computing an empty area for each bounding box and selecting the patches whose empty area exceeds a predetermined threshold value, wherein patch splitting (410) is performed for the selected patches which are divided into smaller patches to achieve maximum space optimization.

2. The process as claimed in claim 1, wherein the material information (401) includes material type, weight, dimensions, description, and orientation based on a texture directions or a prints, and the length of the print.

3. The process as claimed in claim 1, wherein the patch merging (407) of the first 3D surface (406) reduces the number of patches leading to fewer cuts and seams, thereby resulting in improved efficiency during garment manufacturing.

4. The process as claimed in claim 1, wherein the down sampling of each boundary of the curved segments is halted if the distortion of the first 3D surface (406) reaches a pre-defined threshold value.

5. The process as claimed in claim 1, wherein the patch merge (407), the patch shape optimization (408), the strip packing (409) and the patch splitting (410) is performed repeatedly until a zero-waste permutation is determined thereby resulting in minimum fabric/material consumption, minimum cuts, and maximum 3D surface similarity compared to the second 3D surface stemming from the original pattern.

6. The process as claimed in claim 1, wherein an additional garment (412) is incrementally increased subsequent to the patch splitting (410) until a zero-waste configuration is obtained.

* * * * *